United States Patent
Kiszely

(10) Patent No.: US 7,076,059 B1
(45) Date of Patent: Jul. 11, 2006

(54) METHOD AND APPARATUS TO IMPLEMENT THE DATA ENCRYPTION STANDARD ALGORITHM

(75) Inventor: Timothy W. Kiszely, Brighton, MA (US)

(73) Assignee: Cavium Networks, Mountain View, CA (US)

( * ) Notice: Subject to any disclaimer, the term of this patent is extended or adjusted under 35 U.S.C. 154(b) by 872 days.

(21) Appl. No.: 10/052,054

(22) Filed: Jan. 17, 2002

(51) Int. Cl.
    *H04L 9/06* (2006.01)
(52) U.S. Cl. .......................................... 380/29; 380/28
(58) Field of Classification Search ................ 380/29, 380/37
    See application file for complete search history.

(56) References Cited

U.S. PATENT DOCUMENTS

| | | | |
|---|---|---|---|
| 3,958,081 A * | 5/1976 | Ehrsam et al. ............... 380/29 |
| 3,962,539 A * | 6/1976 | Ehrsam et al. ............... 380/29 |
| 4,319,079 A * | 3/1982 | Best ........................... 713/190 |
| 4,543,646 A * | 9/1985 | Ambrosius et al. .......... 380/29 |
| 4,947,428 A * | 8/1990 | Guillou et al. .............. 380/240 |
| 5,289,542 A * | 2/1994 | Kessler ....................... 380/257 |
| 5,351,299 A * | 9/1994 | Matsuzaki et al. ........... 380/37 |
| 5,442,705 A * | 8/1995 | Miyano ....................... 380/29 |
| 5,513,262 A * | 4/1996 | van Rumpt et al. ......... 380/29 |
| 5,539,827 A * | 7/1996 | Liu ............................. 380/37 |
| 5,592,553 A * | 1/1997 | Guski et al. ................ 713/159 |
| 5,661,807 A * | 8/1997 | Guski et al. ................ 713/159 |
| 5,675,653 A * | 10/1997 | Nelson, Jr. .................. 380/28 |
| 5,796,837 A * | 8/1998 | Kim et al. ................... 380/28 |
| 5,835,599 A * | 11/1998 | Buer ........................... 380/29 |
| 5,949,884 A * | 9/1999 | Adams et al. ............... 380/29 |
| 6,006,321 A * | 12/1999 | Abbott ........................ 712/43 |
| 6,108,421 A * | 8/2000 | Kurdziel et al. ............. 380/28 |
| 6,121,791 A * | 9/2000 | Abbott ........................ 326/39 |
| 6,150,836 A * | 11/2000 | Abbott ........................ 326/38 |
| 6,272,221 B1 * | 8/2001 | Tsunoo ....................... 380/28 |
| 6,278,783 B1 * | 8/2001 | Kocher et al. ............. 380/277 |
| 6,298,136 B1 * | 10/2001 | Den Boer .................... 380/29 |
| 6,304,658 B1 * | 10/2001 | Kocher et al. ............... 380/30 |
| 6,351,142 B1 * | 2/2002 | Abbott ........................ 326/39 |
| 6,357,009 B1 * | 3/2002 | Giles et al. ................ 713/200 |
| 6,381,699 B1 * | 4/2002 | Kocher et al. .............. 713/172 |
| 6,400,824 B1 * | 6/2002 | Mansoorian et al. ........ 380/269 |
| 6,438,569 B1 * | 8/2002 | Abbott ........................ 708/603 |
| 6,442,525 B1 * | 8/2002 | Silverbrook et al. ........... 705/1 |
| 6,466,669 B1 * | 10/2002 | Matsui et al. ................ 380/37 |
| 6,542,607 B1 * | 4/2003 | Euchner et al. ............. 380/37 |
| 6,578,150 B1 * | 6/2003 | Luyster ....................... 713/200 |
| 6,704,871 B1 * | 3/2004 | Kaplan et al. .............. 713/192 |
| 6,708,273 B1 * | 3/2004 | Ober et al. ................. 713/189 |
| 6,751,319 B1 * | 6/2004 | Luyster ....................... 380/37 |
| 6,816,968 B1 * | 11/2004 | Walmsley ................... 713/168 |

(Continued)

OTHER PUBLICATIONS

Menezes et al., Handbook of Applied Cryptography, 1996, CRC Press, pp. 223-282.*

(Continued)

*Primary Examiner*—Ayaz Sheikh
*Assistant Examiner*—David Garcia Cervetti
(74) *Attorney, Agent, or Firm*—Blakely, Sokoloff, Taylor & Zafman LLP

(57) ABSTRACT

A method and apparatus to encipher a block of data using the data encryption standard comprising exclusive-oring, using an exclusive-or gate, the output from a merged permutation and expansion (MPE) and a sub key block, and sending the output from the exclusive-or gate to a selection function.

21 Claims, 3 Drawing Sheets

U.S. PATENT DOCUMENTS

| | | | |
|---|---|---|---|
| 6,914,984 B1* | 7/2005 | Lim | 380/29 |
| 2002/0003876 A1* | 1/2002 | Lim | 380/29 |
| 2002/0009196 A1* | 1/2002 | Lim | 380/37 |
| 2002/0012430 A1* | 1/2002 | Lim | 380/29 |
| 2002/0018562 A1* | 2/2002 | Lim | 380/37 |
| 2002/0021802 A1* | 2/2002 | Muratani et al. | 380/29 |
| 2002/0106078 A1* | 8/2002 | Qi et al. | 380/29 |
| 2002/0106080 A1* | 8/2002 | Qi et al. | 380/37 |
| 2003/0002664 A1* | 1/2003 | Anand | 380/37 |
| 2003/0023950 A1* | 1/2003 | Ma et al. | 717/102 |

OTHER PUBLICATIONS

Frank Hoornaert, Jo Goubert, Yvo Desmedt, Efficient Hardware Implementation of the DES, Lecture Notes in Computer Science, vol. 196, Jan. 1985, p. 147.*

Eberle, Hans, A high-speed DES implementation for network applications, Sep. 23, 1992, <http://www.hpl.hp.com/techreports/Compaq-DEC/SRC-RR-90.html>.*

Smith et al., Cryptographic Support in a Gigabit Network, 1992, Proceedings of INET.*

McLoone et al., A High Performance FPGA Implementation of DES, 2000, IEEE.*

Lim, Efficient 8-Cycle DES implementation, 2000, IEEE, pp. 175-178.*

Wong et al., A Single Chip FPGA Implementation of the Data Encryption Standard (DES) Algorithm, 1998, IEEE, pp. 827-832.*

Bruce Schneier, Applied Cryptography, 1996, John Wiley & Sons, pp. 270-278.*

Kaps, Jens-Peter, High Speed FPGA Architectures for the Data Encryption Standard, May 1998, Worcester Polytechnic Institute.*

M. Shand and J. Vuillemin, "Fast Implementations of RSA Cryptography", Digital Equipment Corporation, Paris Research Laboratory (PRL).

AJ Elbirt and C. Paar, "Towards an FPGA Architecture Optimized for Public-Key Algorithms", Presented at SPIE's Symposium on Voice, Video, and Communications, Boston, MA, USA, Sep. 20, 1999.

Internet Key Exchange Security Protocol www.cisco.com/univercd/cc/td/doc/product/software/ios113ed/113t/113t_3/isakmp.htm Jun. 1, 2001, 45 pages.

How SSL Works http://developer.netscape.com/tech/security/ssl/howitworks.html Jun. 1, 2001, five pages.

Savolainen, Sampo, "Internet Key Exchange (IKE)", Department of Electrical and Communications Engineering, Helsinki University of Technology, Nov. 22, 1999, 12 pages.

Data Encryption Standard (DES); FIPS Pub 46-2, Dec. 30, 1993, 16 pages.

3.2.1 What is DES?, http://www.rsasecurity.com/rsalabs/faq/3-2-1.html, Jul. 13, 2001, one page.

Federal Information Processing Standards Publication 46-2, Announcing the Data Encryption Standard (DES), http://raphael.math.uic.edu/~jeremy/crypt/text/desfips.txt, Jul. 13, 2001, 6 pages.

The Data Encryption Standard: An Update, http://raphael.math.uic.edu/~jeremy/crypt/text/des.txt, Jul. 13, 2001, 7 pages.

Internet Key Exchange Security Protocol http://www.cisco.com/univercd/cc/td/doc/product/software/ios113ed/113t/113t_3/isakmp.htm Feb. 6, 2002, 49 pages.

* cited by examiner

METHOD AND APPARATUS TO IMPLEMENT THE DATA ENCRYPTION STANDARD ALGORITHM

BACKGROUND

1. Field of the Invention

The present invention is related to the field of data encryption. In particular, the present invention is related to a method and apparatus to implement the data encryption standard algorithm.

2. Description of the Related Art

The data encryption standard (DES) specifies a cryptographic algorithm for encrypting and decrypting binary information comprising of 64 bits using a 64-bit key. (Please see the federal information processing standards (FIPS) publication 46-2). The DES specifies both encrypting and decrypting operations, and decrypting is accomplished by using the same key as is used for encrypting but with the schedule for addressing the key bits altered so that decrypting is the reverse of the encrypting process.

A key in the DES consists of 64 binary bits, 56 of these bits are randomly generated and are used by the DES algorithm. The other 8 bits of the key are used for error detection. Users of the encrypted computer data must have the key that was used to encrypt the data in order to decrypt it.

A data block that is to be encrypted is subject to an initial permutation (IP), then to a complex key-dependent computation, and finally to a permutation which is the inverse of the initial permutation ($IP^{-1}$).

FIG. 1 illustrates a block diagram of a prior art DES implementation 100. As illustrated in FIG. 1, at 105 an input comprising a 64-bit block of data is subject to an IP, to form a permuted input block. The permuted input block 110 is split into a left data block $L_{i-4}$ 120 and a right data block $R_{i-4}$ 115. Each block $L_{i-4}$ and $R_{i-4}$ comprises 32 data bits. FIG. 1 illustrates 4 DES iterations (181–184) of the 16 DES iterations specified in (FIPS) publication 46-2.

Mathematically, for each DES iteration if the 64 bits of an input block consists of a 32-bit block L followed by a 32-bit block R, then, the input block 105 is LR.

Let K be a block of 48 bits chosen from the 64-bit key. Then the output L'R' of a single DES iteration with input LR is defined by:

$$L' = R \text{ and } R' = L(+)f(R, K) \quad [1]$$

where (+) in equation [1] denotes bit-by-bit addition modulo 2, i.e., an exclusive-or (XOR) function. The next DES iteration uses as input the output from the previous iteration. For the first DES iteration 181, the input block is the left data block $L_{i-4}$ 120 and the right data block $R_{i-4}$ 115. After the first DES iteration, the output block is:

$$L_{i-3} = R_{i-4} \text{ and } R_{i-3} = L_{i-4}(+)f(R_{i-4}, K_{i-4}) \quad [2]$$

While the first 15 iterations have as their output L'R', the standard specifies that the output of the 16th iteration is R'L' (also called the pre-output block), which is input into an inverse permutation to generate an encrypted output L'R'. At each iteration, a different block K of key bits, called a sub key, is chosen from the 64-bit key. For details on choosing a sub key block in each DES iteration [1] please refer to FIPS publication 46-2.

The first DES iteration 181 includes a cipher function f(R, K) that comprises expanding $R_{i-4}$ 115 from 32 bits to 48 bits using expanding function $E_{i-4}$ 121. Thus, expanding function $E_{i-4}$ 121 takes a block of 32 $R_{i-4}$ bits as input and generates a block of 48 bits as output. The 48-bit expanded $R_{i-4}$ output and a first arrangement of 48 sub key bits $K_{i-4}$ 125 are exclusive-or'd using an exclusive-or function called the first key exclusive-or function 130. The 48 bit output from the first key XOR function 130 is input into a selection function $S_{i-4}$ 135 to obtain a 32 bit selection function output. Selection function $S_{i-4}$ 135 comprises 8 unique selection sub-functions, each of which take 6 bits of the 48 bit output from the first key exclusive-or function 130 as input and yields a 4-bit output. The 32-bit selection function $S_{i-4}$ 135 output is input into a permutation function $P_{i-4}$ 140 to yield a 32-bit permuted result. A second exclusive-or function, called the first L component XOR function 145, exclusive-ors the 32-bit permuted result with the 32 bit left data block $L_{i-4}$ 120 to yield a right output block $R_{i-4}$ 155 of the first DES iteration 181. The left output block, $L_{i-3}$ 150 of the first DES iteration comprises the 32-bits of the right data block $R_{i-4}$ 115. This completes the first DES iteration 181.

The left output block, $L_{i-3}$ 150 and the right output block $R_{i-3}$ 155 of the first DES iteration 181 serve as input into the second DES iteration 182 to obtain outputs $L_{i-2}$ 161 and $R_{i-2}$ 162 respectively as described above. Thus, $R_{i-3}$ 155 is input into expanding function $E_{i-3}$ 154, and the output from expanding function $E_{i-3}$ 154 is exclusive-ord with a second key block $K_{i-3}$ 157 using a second key XOR function 156. The output from the second key XOR function 156 is input into selection function $S_{i-3}$ 158, and the output from selection function $S_{i-3}$ 158 is input into permutation function $P_{i-3}$ 159 to yield a 32 bit permuted result. The output from permutation function $P_{i-3}$ 159 is exclusive-ord with $L_{i-3}$ 150 using a second L component XOR function 160 to form output $R_{i-2}$ 162. The left output block, $L_{i-2}$ 161 of the second DES iteration 182 comprises the 32-bits of the right data block $R_{i-3}$ 155.

Subsequent DES iterations are repeated multiple times (e.g., at least 16 times) using the output from the previous iteration, with different key blocks. After the multiple iterations, a left and a right pre-output block is obtained. The pre-output blocks are input into $IP^{-1}$ (not shown) to obtain an encrypted output.

As illustrated in FIG. 1 each cipher function f(R, K) includes two XOR functions (e.g., the first key XOR function 130, and the first L component XOR function 145 of the first DES iteration 181) in the critical path of the calculation. Therefore, for 16 DES iterations, thirty-two XOR functions are in the critical path, and as a result the encryption and/or decryption of data is inefficient.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

Described is a method and apparatus for implementing the DES algorithm. In the following description numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid obscuring the present invention.

In addition, it should be understood that the embodiments described herein are not related or limited to any particular hardware technology. Rather, the embodiments described may be constructed using various technologies (e.g., bipolar technology, complimentary-metal-oxide-semiconductors (cmos) technology, etc.) in accordance with the teachings described herein. Similarly, it may prove advantageous to construct a specialized apparatus to perform the teachings described herein by way of discrete components, or by way of an integrated circuit that uses one or more integrated circuit die that may be interconnected. Lastly, repeated usage of the phrase "in one embodiment" does not necessarily refer to the same embodiment, although it may.

Figure 1:
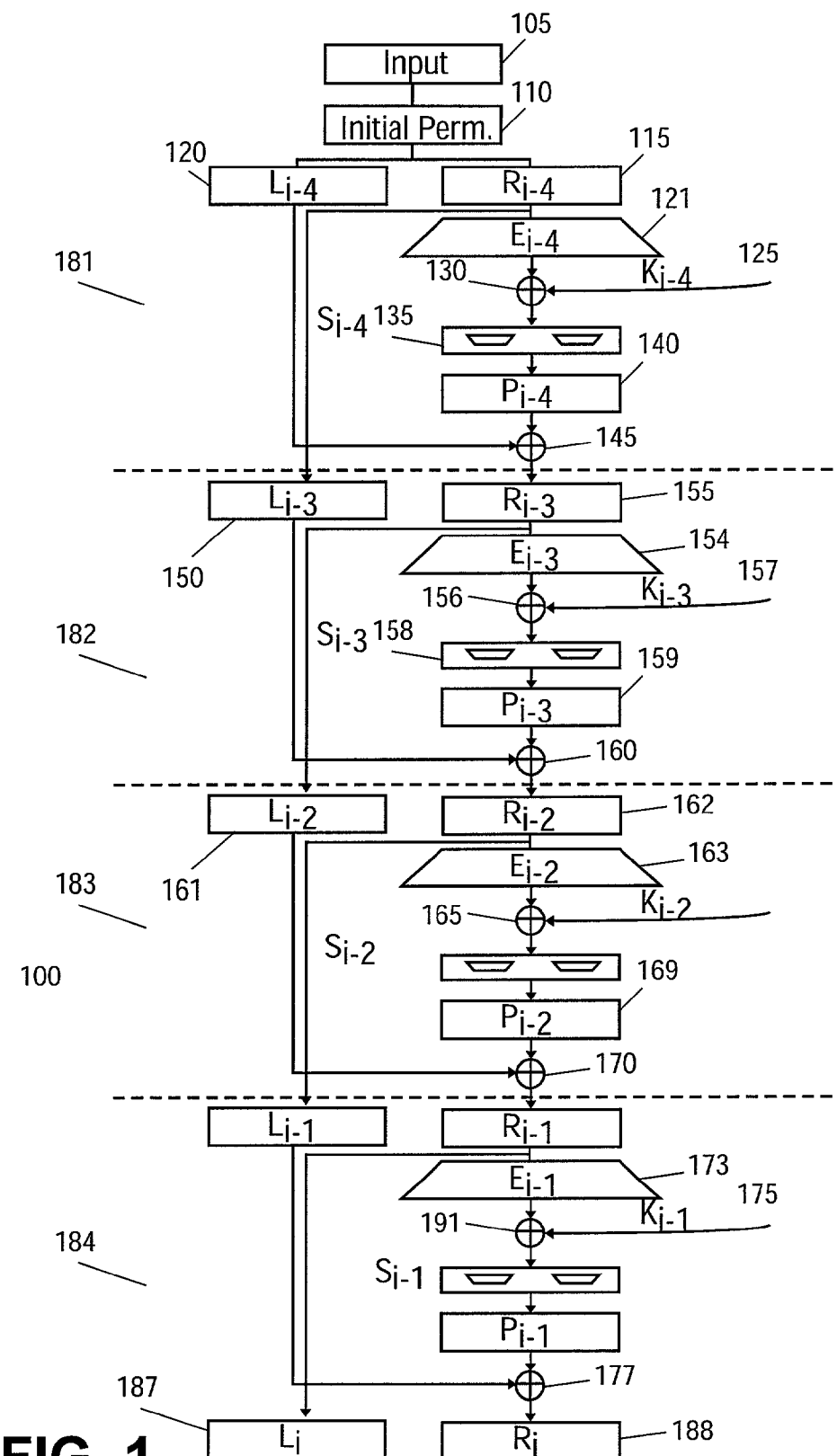
FIG. 1 illustrates a block diagram of a prior art DES implementation.
Figure 2:
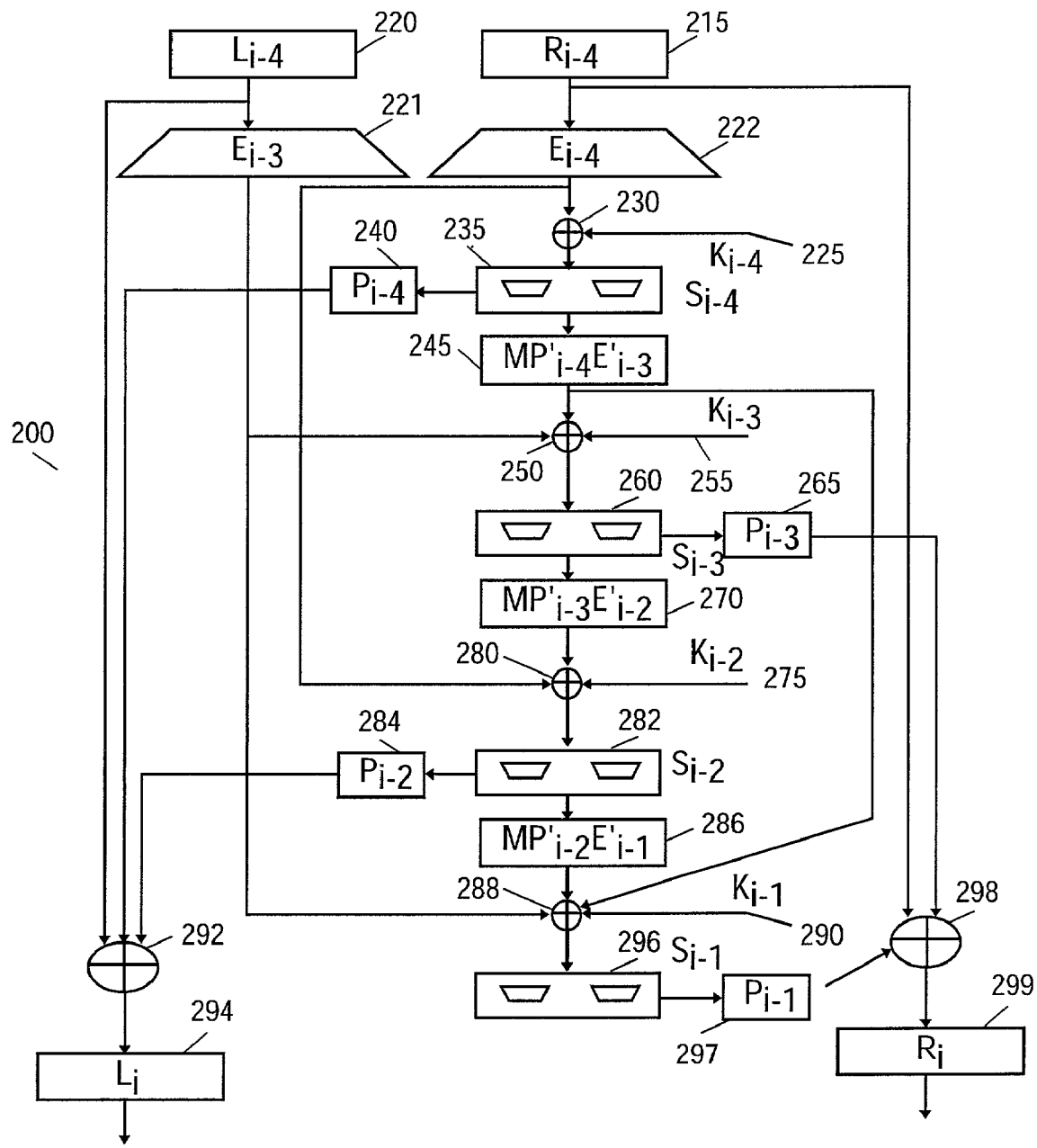
FIG. 2 illustrates a block diagram of a DES implementation according to one embodiment of the invention.

FIG. 2 illustrates a block diagram of a DES implementation according to one embodiment of the invention. As illustrated in FIG. 2, the four DES iterations (181–184) of FIG. 1 are performed in a single clock cycle 200. Thus, the embodiment of FIG. 2 performs 16 DES iterations in 4 clock cycles. Although the embodiment of FIG. 2 illustrates 4 DES iterations in a single clock cycle, other embodiments may perform other multiples (even or odd multiples) of DES iterations in a single clock cycle.

The embodiment of FIG. 2 illustrates a permuted input block split into a left data block $L_{i-4}$ 220 and a right data block $R_{i-4}$ 215. Each block $L_{i-4}$ and $R_{i-4}$ comprises 32 data bits. The left data block $L_{i-4}$ 220 and the right data block $R_{i-4}$ 215 are expanded to 48 bits using the same expanding function E (In FIG. 2, $L_{i-4}$ 220 and $R_{i-4}$ 215 respectively provided to instances of expanding function $E_{i-3}$ 221 and $E_{i-4}$ 222). Details of the expansion function E may be found in FIPS publication 46-2.

For each DES cycle, 200, if the 64 bits of an input block is split into a left 32-bit block $L_{i-4}$ followed by a right 32-bit block $R_{i-4}$, then, the permuted input block is $L_{i-4}R_{i-4}$.

Let K represent four blocks of 48 bits chosen from the 64-bit key. Then the output $L_iR_i$ of a single DES cycle 200 with input $L_{i-4}R_{i-4}$ is defined by:

$$L_i = L_{i-4}(+)P_{i-4}(+)P_{i-2}, \text{ and } R_i = R_{i-4}(+)P_{i-3}(+)P_{i-1} \quad [3]$$

where $P_{i-4} = g(R_{i-4}, K_{i-4})$ \quad [4]

$P_{i-3} = g(L_{i-3}, R_{i-4}, K_{i-3})$ \quad [5]

$P_{i-2} = g(R_{i-4}, K_{i-2})$ \quad [6]

$P_{i-1} = g(L_{i-4}, R_{i-4}, K_{i-1})$ \quad [7]

For each of the DES iterations in FIG. 2, four different blocks of key bits (225, 255, 275, and 290), called sub keys, are chosen from a 64-bit key. For details on choosing a key block please refer to FIPS publication 46-2.

After expanding the left data block $L_{i-4}$ 220 using expanding function $E_{i-3}$ 221 and the right data block $R_{i-4}$ 215 using expanding function $E_{i-4}$ 222 respectively, the output from expanding function $E_{i-4}$ 222 is exclusive-ord, using a key XOR function 230, with a first sub-key block $K_{i-4}$ 225. The output from key XOR function 230 is input into a selection function $S_{i-4}$ 235, and a first output from $S_{i-4}$ 235 is input into a permutation function $P_{i-4}$ 240.

Details of the permutation function may be found in FIPS publication 46-2. An alternate embodiment of the permutation function P is shown in Table 1.

TABLE 1

Permutation Function Bit Mapping

| P Output Bits | 31 30 29 28 27 26 25 24 | 23 22 21 20 19 18 17 16 |
|---|---|---|
| P Input Bits | 16 25 12 11  3 20  4 15 | 31 17  9  6 27 14  1 22 |
| P Output Bits | 15 14 13 12 11 10  9  8 |  7  6  5  4  3  2  1  0 |
| P Input Bits | 30 24  8 18  0  5 29 23 | 13 19  2 26 10 21 28  7 |

Table 1 illustrates that permutation function P re-arranges the input to the permutation function P to yield the 32-bit output. For example, bits 16, 25 and 12 at the input of the permutation function yield bits 31, 30 and 29 at the output of the permutation function, and so on. Thus, the output of selection function $S_{i-4}$ 235 is re-arranged by permutation function $P_{i-4}$ 240. Hence, $P_{i-4} = g(R_{i-4}, K_{i-4})$ as illustrated in [4].

In addition, a second output from selection function $S_{i-4}$ 235 is input into a merged permutation and expansion (MPE) function $MP'_{i-4}E'_{i-3}$ 245. The MPE function is illustrated in Table 2. (Note: the data in Table 1 and Table 2 is represented in msb:1sb bit format and not in the big endian format).

| MEP function Output Bit | 47 46 45 44 43 42 41 40 | 39 38 37 36 35 34 33 32 |
|---|---|---|
| MEP function Input Bit | 7 16 25 12 11  3 11  3 | 20  4 15 31 15 31 17  9 |
| MEP function Output Bit | 31 30 29 28 27 26 25 24 | 23 22 21 20 19 18 17 16 |
| MEP function Input Bit | 6 27  6 27 14  1 22 30 | 22 30 24  8 18  0 18  0 |
| MEP function Output Bit | 15 14 13 12 11 10  9  8 |  7  6  5  4  3  2  1  0 |
| MEP function Input Bit | 5 29 23 13 23 13 19  2 | 26 10 26 10 21 28  7 16 |

As illustrated in Table 2, the input to the MPE function is rearranged and expanded to form a 48-bit block of data from a 32-bit data block. For example, bits 7, 16, and 25 at the input of the MPE function, at 245, form bits 47, 46, and 45 at the output of the MEP function.

The MPE function $MP'_{i-4}E'_{i-3}$ 245 combines functions $P_{i-4}$ 140 and $E_{i-4}$ 154 of FIG. 1. The output from the MPE function $MP'_{i-4}E'_{i-3}$ 245, the output from $E_{i-3}$ 221, and a second sub key block, $K_{i-3}$ 255, comprising 48 key bits are input into a first merged L component key XOR function 250. The first merged L component key XOR function 250 effectively performs the operations of the first L component XOR function 145 and the second key XOR function 156 of FIG. 1 (it should now be understood that the expanding function 221 is used because its output is being inserted into the critical path after the $MP'_{i-4}E'_{i-3}$ 245 as $L_{i-4}$ at the first merged L component key XOR function 250, as opposed to in an unexpanded form at the first L component XOR function 145). The output from the first merged L component key XOR function 250 is input into selection function $S_{i-3}$ 260. The first output from $S_{i-3}$ 260 is input into permutation function $P_{i-3}$ 265, and the second output from $S_{i-3}$ 260 is input into MPE function $MP'_{i-4}E'_{i-2}$ 270. Thus, $P_{i-3} = g(L_{i-3}, R_{i-4}, K_{i-3})$ as illustrated in [5].

The MPE function $MP'_{i-3}E'_{i-2}$ 270 combines functions $P_{i-3}$ 159 and $E_{i-2}$ 163 of FIG. 1. The output from MPE function $MP'_{i-3}E'_{i-2}$ 270, a third sub key block $K_{i-2}$ 275, comprising 48 key bits, and the output from expanding function $E_{i-4}$ 222 are exclusive-ord, using a second merged L component key XOR function 280. The second merged L component key XOR function 280 effectively performs the operations of the second L component XOR function 160 and the third key XOR function 165 of FIG. 1 (it should now be understood that the output of the expanding function 222 is used because its output is being inserted into the critical path after the $MP'_{i-3}E'_{i-2}$ 270 as $L_{i-3}$ at the second merged L component key XOR function 280, as opposed to in an unexpanded form at the second L component XOR function 160). The output from the second merged L component key XOR function 280 is input into the selection function $S_{i-2}$ 282. Selection function $S_{i-2}$ 282 has two outputs, the first output from $S_{i-2}$ 282 is input into permutation function $P_{i-2}$ 284, and the second output from $S_{i-2}$ 282 is input into MPE function $MP'_{i-2}E'_{i-1}$ 286. Thus, $P_{i-2}=g(R_{i-4},K_{i-2})$ as illustrated in [6].

The MPE function $MP'_{i-2}E'_{i-1}$ 286 combines functions $P_{i-2}$ 169 and $E_{i-1}$ 173 of FIG. 1. The output from MPE function $MP'_{i-2}E'_{i-1}$ 286, a fourth sub key block $K_{i-1}$ 290, comprising 48 key bits, the output from expanding function $E_{i-3}$ 221, and the output from MPE function $MP'_{i-4}E'_{i-3}$ 245 are exclusive-ord (e.g., using a four input exclusive-or gate), using a third merged L component key XOR function 288. The third merged L component key XOR function 288 effectively performs the operations of the third L component XOR function 170 and the fourth key XOR function 175 of FIG. 1 (it should now be understood that the expanding function 221 is used because its output is being inserted into the critical path after the $MP'_{i-2}E'_{i-1}$ 286 as $L_{i-2}$ at the third merged L component key XOR function 288, as opposed to in an unexpanded form at the third L component XOR function 170. The output from the third merged L component key XOR function 288 is input into the selection function $S_{i-1}$ 296. Selection function $S_{i-1}$ 296 has one output, the output from $S_{i-1}$ 296 is input into permutation function $P_{i-1}$ 297. Thus, $P_{i-1}=g(L_{i-4},R_{i-4},K_{i-3})$ as illustrated in [7].

The 32 bit output from permutation function $P_{i-1}$ 297, the 32 bit output from permutation function $P_{i-3}$ 265, and the 32 bit right data block $R_{i-4}$ 215 are input into a first collected L component XOR function 298 to obtain an intermediate ciphered right data word $R_i$ 299. Specifically, the exclusive-oring of $R_{i-4}$ 215 (acting as $L_{i-3}$) with the output of $P_{i-3}$ 159 generates $R_{i-2}$, which is the equivalent of $L_{i-1}$; the exclusive-oring of this $L_{i-1}$ with the output of $P_{i-1}$ 297 produces $R_i$ 299. So also, the 32 bit output from permutation function $P_{i-4}$ 240, the 32 bit output from permutation function $P_{i-2}$ 284, and the 32 bit left data block $L_{i-4}$ 220 are input into an XOR function, called the second collected L component XOR function 292 to obtain an intermediate ciphered left data word $L_i$ 294. (Specifically, the exclusive-oring of $L_{i-4}$ with the output of $P_{i-4}$ 240 generates $R_{i-3}$, which is the equivalent of $L_{i-2}$; the exclusive-oring of this $L_{i-2}$ with the output of $P_{i-2}$ 284 produces $L_i$ 294).

In one embodiment, the output from $L_i$ 294 and $R_i$ 299 is fed back as an input to $L_{i-4}$ 220 and $R_{i-4}$ 215. This feed back of data is repeated multiple times (e.g., 4 times to complete 16 DES iterations), with different sub key blocks. In one embodiment, after the fourth clock cycle (i.e., after the $16^{th}$ DES iteration), the outputs from $L_i$ 294 and $R_i$ 299 obtained are the pre-output blocks. These pre-output blocks are input into $IP^{-1}$ (not shown) to obtain a DES encrypted output.

$L_i$ 294 and $R_i$ 299 (i.e., the output after 4 DES iterations) in FIG. 2 correspond with the values of $L_i$ 187 and $R_i$ 188 in prior art FIG. 1. However, as illustrated in FIG. 2, in order to obtain $L_i$ 294 and $R_i$ 299 the data flows through six XOR gates (i.e., XOR gates 230, 250, 280, 288, 292 and 299).

More particularly, for the four DES iterations illustrated in FIG. 2, only five of the six XOR gates (i.e., XOR gates 230, 250, 280, 288, and 298) are in the critical path of the DES calculation, whereas in the prior art of FIG. 1 for four DES iterations, eight XOR gates (i.e., XOR gates 130, 145, 156, 160, 165, 170, 191, and 177) are in the critical path of the calculation. By eliminating XOR gates (145, 160, and 170) from the critical path the efficiency with which data is encrypted and/or decrypted is significantly improved.

In one embodiment, $L_i$ 294 is calculated concurrently with the input of data into MPE function $MP'_{i-2}E'_{i-4}$ 286, achieving a further increase in efficiency.

In the embodiment illustrated in FIG. 2, the 16 DES iterations (required by the DES specification) have twenty XOR gates in the critical path. Having twenty XOR gates in the critical path for sixteen DES iterations as opposed to 32 XOR gates required in the critical path of the prior art increases the efficiency of the DES algorithm calculation.

While in one embodiment the functions shown in FIG. 2 are each performed in a separate hardware module (e.g., $L_{i-4}$ 220 is expanded using one hardware expanding module, while $R_{i-4}$ 215 is expanded using another hardware expanding module), in alternative embodiments certain modules are shared by two or more of the functions illustrated in FIG. 2. Similarly, while in one embodiment the exclusive-or functions are implemented using exclusive-or gates, alternative embodiments implement one or more of the XOR functions using a different combination of gates. Although the embodiment of FIG. 2 illustrates performing 4 DES iterations per cycle, other embodiments may use other multiples of DES iterations so long as each DES cycle uses one or more MEP functions, and moves the non-key XOR functions out of the critical path.

In one embodiment, the circuit performing the functions shown in FIG. 2 is implemented in an execution unit in a co-processor that communicates with a host processor via a bus, alternative embodiments may have multiple execution units within the co-processor wherein each execution unit performs encryption/decryption of data. In the embodiment with multiple execution units, multiple blocks of data are simultaneously encrypted or decrypted. In still other embodiments, the co-processor may reside within the processor such that communications between the co-processor and the processor are internal to the processor. In one embodiment, the co-processor is implemented in a network card as an inline processor so that communications between a processor on the network card and the co-processor occur via a peripheral bus (e.g., a PCI bus), alternative embodiments implement the co-processor in a router (e.g., in a line card), in a switch, in a server, or even in a personal computer.

Figure 3:
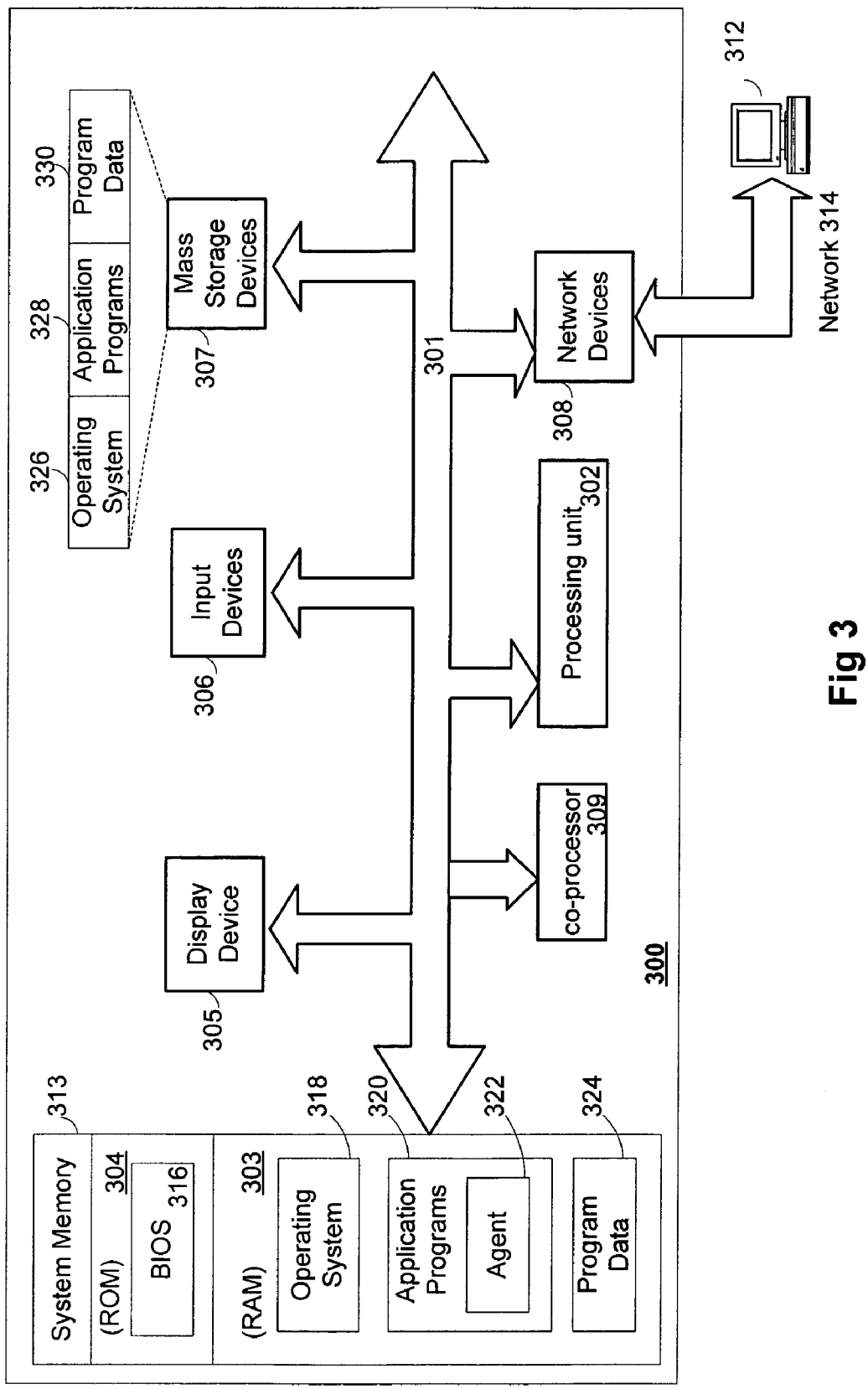
FIG. 3 illustrates an apparatus for a DES implementation according to one embodiment of the invention.

FIG. 3 illustrates a typical computer system 300 in which the present invention operates. The computer system is used for, implementing the DES algorithm. One embodiment of the present invention is implemented using personal computer (PC) architecture. It will be apparent to those of ordinary skill in the art that alternative computer system architectures or other processor, programmable or electronic-based devices may also be employed.

In general, the computer systems illustrated by FIG. 3 includes a processing unit 302 coupled through a bus 301 to a system memory 313. System memory 313 comprises a read only memory (ROM) 304, and a random access memory (RAM) 303. ROM 304 comprises Basic Input Output System (BIOS) 316, and RAM 303 comprises operating system 318, application programs 320, agent 322, and program data 324.

Computer system 300 includes mass storage device 307, input devices 306 and display device 305 coupled to processing unit 302 via bus 301. Mass storage device 307 represents a persistent data storage device, such as a floppy disk drive, fixed disk drive (e.g., magnetic, optical, magneto-optical, or the like), or streaming tape drive. Mass storage device stores program data 330, application programs 328, and operating system 326. Application programs 328 may include agent software 322. Processing unit 302 may be any of a wide variety of general purpose processors or microprocessors (such as the Pentium® processor manufactured by Intel® Corporation), a special purpose processor, or even a specifically programmed logic device.

In one embodiment, the processing unit 302 communicates with co-processor 309 and sends co-processor 309 one or more commands to compute an encryption/decryption of a data block. Co-processor 309 encrypts and/or decrypts the data block in accordance with the flow diagram illustrated in FIG. 2, and provides processing unit 302 with the result of the encryption/decryption. In one embodiment, co-processor 309 comprises one or more execution units (not shown), wherein each execution unit performs the functions illustrated in FIG. 2.

Display device 305 provides graphical output for computer system 300. Input devices 306 such as a keyboard or mouse are coupled to bus 301 for communicating information and command selections to processor 302. Also coupled to processor 302 through bus 301 are one or more network devices 308 that can be used to control and transfer data to electronic devices (printers, other computers, etc.) connected to computer 300. Network device 308 connects computer system 300 to a network 314, and may include Ethernet devices, phone jacks and satellite links. This network 314 can connect computer 300 to another computer 312.

Thus, a method and apparatus have been disclosed for implementing the DES algorithm. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An apparatus comprising:
   a left expansion module and a right expansion module, said left expansion module coupled to a first merged L component key XOR gate and to a third merged L component key XOR gate;
   said right expansion module coupled to a key XOR gate, and to a second merged L component key XOR gate;
   said key XOR gate coupled to a first selection function module (SFM), the first SFM having a first output and a second output;
   said first output of the first SFM coupled to a first permutation function module (PFM) and the second output of the first SFM output is coupled to a first merged permutation and expansion function (MPE) module;
   said first PFM coupled to a second collected L component XOR gate;
   said first MPE module coupled to the first merged L component key XOR gate, and to the third merged L component key XOR gate;
   said first merged L component key XOR gate coupled to a second SFM having a first output and a second output;
   said first output of the second SFM coupled to a second PFM; and
   said second PFM coupled to a first collected L component XOR gate.

2. The apparatus of claim 1 further comprising:
   said second output of the second SFM coupled to a second MPE module;
   said second MPE module coupled to the second merged L component key XOR gate;
   said second merged L component key XOR gate coupled to a third SFM having a first output and a second output;
   said first output of the third SFM coupled to a third PFM, and said second output of the third SFM coupled to a third MPE module;
   said third MPE module coupled to said third merged L component key XOR gate;
   said third merged L component key XOR gate coupled to a fourth SFM;
   said fourth SFM coupled to a fourth PFM; and
   said fourth PFM coupled to the first collected L component XOR gate.

3. The apparatus of claim 2 wherein the output of the second collected L component XOR gate is coupled to the input of the left expansion module and the output of the first collected L component XOR gate is coupled to the input of the right module function.

4. The apparatus of claim 2 wherein the key XOR gate exclusive-ors the output of the right expansion module and a first sub key block.

5. The apparatus of claim 2 wherein the first merged L component key XOR gate exclusive-ors the output of the first MPE module, the output from the left expansion module, and a second sub key block.

6. The apparatus of claim 2 wherein the second merged L component key XOR gate exclusive-ors the output of the second MPE module, the right expansion module, and a third sub key block.

7. The apparatus of claim 2 wherein the third merged L component key XOR gate exclusive-ors the output from the third MPE module, the left expansion module and a fourth sub key block.

8. A method to encrypt a block of data comprising:
   splitting the block of data into a left data block and a right data block;
   expanding the left data block and the right data block;
   exclusive-oring, using a key XOR gate, the right expanded data block and a first sub key;
   sending the output from the key XOR gate to a first selection function module (SFM), the first SFM having a first output and a second output;
   sending data at the first output of the first SFM to a first permutation function module (PFM):
   sending data at the second output of the first SFM to a first merged permutation and expansion function module (MPE);
   exclusive-oring, using a first merged L component key XOR gate, the output from the first MPE, a second sub key and the expanded left data block;
   sending the output from the first merged L component key XOR gate to a second SFM, the second SFM having a first output and a second output;

sending data at the first output of the second SFM to a second PFM;

sending data at the second output of the second SFM to a second MPE;

exclusive-oring, using a second merged L component key XOR gate, the output from the second MPE, a third sub key, and the expanded right data block;

sending the output from the second merged L component key XOR gate to a third SFM, the third SFM having a first output and a second output;

sending data from the first output of the third SFM to a third PFM;

sending data at the second output of the third SFM to a third MPE;

exclusive-oring, using a third merged L component key XOR gate, the output from the third MPE, a fourth key block, the left expanded data block, and the first MPE;

sending the output from the second merged L component key XOR gate to a fourth SFM; and sending the output from the fourth SFM to a fourth PFM.

9. The method of claim 8 further comprising:

exclusive-oring the left data block, the first PFM output, and the third PFM output to form a left encrypted data block; and exclusive-oring the right data block, the second PFM output, and the fourth PFM output to form a right encrypted data block.

10. The method of claim 9 wherein the left encrypted data block is obtained concurrently with sending the data to the third MPE.

11. An apparatus comprising;

a bus;

a coprocessor coupled to the bus, said coprocessor having a left expansion module and a right expansion module, said left expansion module coupled to a first merged L component key XOR gate and a third merged L component key XOR gate;

said right expansion module coupled to a key XOR gate, and a second merged L component key XOR gate;

said key XOR gate coupled to a first selection function module (SFM), the first SFM having a first output and a second output;

said first output of the first SFM coupled to a first permutation function module (PFM) and the second output of the first SFM output is coupled to a first merged permutation and expansion function (MPE) module;

said first PFM coupled to a second collected L component XOR gate;

said first MPE module coupled to the first merged L component key XOR gate, and to the third merged L component key XOR gate;

said first merged L component key XOR gate coupled to a second SFM having a first output and a second output;

said first output of the second SFM coupled to a second PFM; and said second PFM coupled to a first collected L component XOR gate.

12. The apparatus of claim 11 further comprising:

said second output of the second SFM coupled to a second MPE module;

said second MPE module coupled to the second merged L component key XOR gate;

said second merged L component key XOR gate coupled to a third SFM having a first output and a second output;

said first output of the third SFM coupled to a third PFM, and said second output of the third SFM coupled to a third MPE module;

said third MPE module coupled to said third merged L component key XOR gate;

said third merged L component key XOR gate coupled to a fourth SFM;

said fourth SFM coupled to a fourth PFM; and said fourth PFM coupled to the first collected L component XOR gate.

13. The apparatus of claim 12 wherein the output of the second collected L component XOR gate is coupled to the input of the left expansion module and the output of the first collected L component XOR gate is coupled to the input of the right expansion module.

14. The apparatus of claim 12 wherein the key XOR gate exclusive-ors the output of the right expansion module and a first sub key block.

15. The apparatus of claim 12 wherein the first merged L component key XOR gate exclusive-ors the output of the first MPE module, the output from the left expansion module, and a second sub key block.

16. The apparatus of claim 12 wherein the second merged L component key XOR gate exclusive-ors the output of the second MPE module, the right expansion module, and a third sub key block.

17. The apparatus of claim 12 wherein the third merged L component key XOR gate exclusive-ors the output from the third MPE module, the left expansion module and a fourth sub key block.

18. An apparatus to perform a data encryption standard iteration, said apparatus including an expansion module to receive a R input, a key XOR, a selection module, a permutation module, and a L component XOR gate, an improvement comprising:

a data encryption standard circuit to perform a series of iterations that contains no L component XOR gates, said data encryption standard circuit to include an expansion module coupled to receive an L Input;

a merged permutation expansion module, coupled to the selection module of each iteration, that results from merging the permutation module of each iteration with the expansion module of the immediately following iteration in the series;

a plurality of merged L component key XOR gates each coupled between a different one of the merged permutation expansion modules and the selection module of the immediately following iteration in the series;

a plurality of permutation modules each coupled to one selection module of a different iteration; and a first and second collected L component XOR gates, coupled to mutually exclusive sets of the permutation modules.

19. The apparatus of claim 18 further comprising the outputs from the first and second collected L component XOR gates fed back to the expansion module coupled to the L input and the expansion module coupled to the R input respectively.

20. An apparatus comprising:

a data encryption standard circuit having an L and R component input and including, a critical path including, a first and second expansion modules respectively coupled to receive the L and R components;

a plurality of selection function modules coupled to each other in series by a merged permutation and expansion module coupled to a merged L component key XOR gate;

a key XOR gate coupled to the first of the selection modules in the series;

a first of a plurality of permutation modules coupled to the last of the plurality of selection function modules in the series; and a non-critical path including,
a first and second L component collection XOR module, said first and second L component collection modules coupled to mutually exclusive groups of the plurality of permutation modules, wherein each of the plurality of permutation modules is coupled to a different one of the selection function modules.

21. The apparatus of claim 20 wherein the output from the first L component collection module is fed back to the L component input, and the output from the second L component collection module is fed back to the R component input.

* * * * *